United States Patent
Kim et al.

(10) Patent No.: US 8,824,562 B2
(45) Date of Patent: Sep. 2, 2014

(54) METHOD AND APPARATUS FOR ENCODING/DECODING COLOR IMAGE

(75) Inventors: Hayoon Kim, Seongnam-si (KR); Haekwang Kim, Seoul (KR); Joohee Moon, Seoul (KR); Yunglyul Lee, Seoul (KR); Byeungwoo Jeon, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 499 days.

(21) Appl. No.: 13/141,184

(22) PCT Filed: Nov. 27, 2009

(86) PCT No.: PCT/KR2009/006772
§ 371 (c)(1),
(2), (4) Date: Jun. 21, 2011

(87) PCT Pub. No.: WO2010/074407
PCT Pub. Date: Jul. 1, 2010

(65) Prior Publication Data
US 2011/0255608 A1    Oct. 20, 2011

(30) Foreign Application Priority Data

Dec. 23, 2008  (KR) .................. 10-2008-0132265

(51) Int. Cl.
*H04N 7/12* (2006.01)
*H04N 7/50* (2006.01)
*H04N 7/26* (2006.01)

(52) U.S. Cl.
CPC ... *H04N 19/00781* (2013.01); *H04N 19/00315* (2013.01)
USPC .................................................. 375/240.25

(58) Field of Classification Search
USPC ........... 375/240.16, 240.24, 240.29; 382/166; 348/461
See application file for complete search history.

(56) References Cited

U.S. PATENT DOCUMENTS

| 5,412,428 | A  | * | 5/1995  | Tahara    | 375/240.25 |
| 6,018,369 | A  | * | 1/2000  | Patterson | 348/461    |
| 7,136,417 | B2 | * | 11/2006 | Rodriguez | 375/240.29 |

(Continued)

FOREIGN PATENT DOCUMENTS

| KR | 10-1999-0055254 | 7/1999  |
| KR | 10-2002-0078523 | 10/2002 |

(Continued)

OTHER PUBLICATIONS

International Search Report mailed Jul. 2, 2010 for PCT/KR2009/006772.

*Primary Examiner* — Dave Czekaj
*Assistant Examiner* — Tracy Li
(74) *Attorney, Agent, or Firm* — Lowe Hauptman & Ham, LLP

(57) ABSTRACT

The present disclosure relates to a method and an apparatus for encoding/decoding a color image or video. The video encoding apparatus encodes a luminance component block for a current block of an image, performs a selection of a color format among a plurality of color formats to encode a chrominance component block for the current block of the image according to the color format upon selection, and generates and outputs a bitstream including the encoded luminance component block, the encoded chrominance component block, and information on the selected color format. The disclosure enables an improvement in compression performance by allowing encoding and decoding one video component image in various color formats.

12 Claims, 10 Drawing Sheets

(56) References Cited

U.S. PATENT DOCUMENTS

| | | | |
|---|---|---|---|
| 7,860,168 B2 * | 12/2010 | Winger | 375/240.24 |
| 2006/0013308 A1 * | 1/2006 | Kim | 375/240.16 |
| 2008/0031518 A1 * | 2/2008 | Song et al. | 382/166 |
| 2008/0240253 A1 * | 10/2008 | Au et al. | 375/240.24 |
| 2009/0003716 A1 * | 1/2009 | Sekiguchi et al. | 382/238 |

FOREIGN PATENT DOCUMENTS

| | | |
|---|---|---|
| KR | 10-2006-0006183 | 1/2006 |
| KR | 10-2006-0108253 | 10/2006 |
| WO | 2008/044637 | 4/2008 |

* cited by examiner

Algorithm COLOR FORMAT SELECTOR

INPUT: 4:4:4 FORMAT CHROMINANCE COMPONENT BLOCK (B444)

4:2:2 FORMAT CHROMINANCE COMPONENT BLOCK (B422)

4:2:0 FORMAT CHROMINANCE COMPONENT BLOCK (B420)

OUTPUT: OPTIMAL COLOR FORMAT, SELECTED CHROMINANCE COMPONENT BLOCK

Begin

- UP-SAMPLE B420 TO GENERATE 4:4:4 FORMAT CHROMINANCE COMPONENT BLOCK (B'444)

If SAD (B'444, B444) < Th (THRESHOLD)

{

- OUTPUT B420 WITH COLOR FORMAT INFO
- Return

}

- UP-SAMPLE B422 TO GENERATE 4:4:4 FORMAT CHROMINANCE COMPONENT BLOCK (B'444)

If SAD (B'444, B444) < Th (THRESHOLD)

{

- OUTPUT B422 WITH COLOR FORMAT INFO
- Return

}

End Algorithm COLOR FORMAT SELECTOR

*FIG. 10*

METHOD AND APPARATUS FOR ENCODING/DECODING COLOR IMAGE

CROSS REFERENCE TO RELATED APPLICATION

This application claims the priority of Korean Patent Application No. 10-2008-0132265, filed on Dec. 23, 2008, in the KIPO (Korean Intellectual Property Office), the disclosure of which is incorporated herein in their entirety by reference. Further, this application is the National Phase application of International Application No. PCT/KR2009/006772, filed Nov. 27, 2009, which designates the United States and was published in English. Each of these applications is hereby incorporated by reference in their entirety into the present application.

TECHNICAL FIELD

The present disclosure relates to a method and an apparatus for encoding/decoding a color image. More particularly, the present disclosure relates to a method and an apparatus for encoding/decoding a component color image of a video in a variety of formats in encoding/decoding an image based on color information of the video.

BACKGROUND ART

The descriptions in this section merely provide background information related to the present disclosure and may not constitute prior art.

Encoding a video involves an indication of a color format of the video expressed by the ratio of luminance signals to chrominance signals of pixels included in a horizontal pixel line of a component picture of the video. Typically, the luminance signals are expressed by Y signals and the chrominance signals are expressed by Cb/Cr signals.

Luminance represents the degree of brightness of an image, and ITU-R recommends using eight bits for indicating the luminance of an image. Chrominance is information to represent the color of an image by using two 8-bit values (Cb/Cr). A coordinate system for representing colors is called a color space where the color format of a video is expressed three pieces of 8-bit information of Y, Cb, and Cr according to the video encoding standard of Moving Picture Expert Group (MPEG).

The typical video compressing techniques such as MPEG-2, MPEG-4, JVT (Joint Video Team) are adapted to compress a video into 4:4:4 color format, 4:2:2 color format, and 4:2:0 color format of videos. These compressing techniques have set color formats in units of video sequences and have a shortcoming that they are incapable of compressing an image constituting the video in various color formats.

DISCLOSURE

Technical Problem

In view of the problem identified above, the present disclosure has been made for encoding and decoding an image constituting the video in various color formats and thereby improving the compression performance.

Technical Solution

To solve the above problem, an aspect of the present disclosure provides a video encoding apparatus including: a luminance component encoder for encoding a luminance component block for a current block of an image; a color format selector for performing a selection of one color format among a plurality of color formats; a chrominance component encoder for encoding a chrominance component block for the current block of the image according to the color format upon selection; and a bitstream output device for generating and outputting a bitstream including the luminance component block upon encoding, the chrominance component block upon encoding, and information on the color format upon selection.

Another solution of the present disclosure provides a video encoding method including: decomposing a current block of an image into a luminance component block and a chrominance component block; encoding the luminance component block; performing a selection of one color format among a plurality of color formats; encoding a chrominance component block according to the one color format upon selection; and generating and outputting a bitstream including the luminance component block upon encoding, the chrominance component block upon encoding, and information on the color format upon selection.

Yet another solution of the present disclosure provides a video decoding apparatus comprising: a bitstream decomposer for extracting information on an encoded luminance component block, an encoded chrominance component block, and a color format from a bitstream; a luminance component decoder for decoding the encoded luminance component block to reconstruct a current block of a luminance component; and a chrominance component decoder for decoding the encoded chrominance component block in the color format according to the information on the color format to reconstruct the current block of a chrominance component.

Yet another solution of the present disclosure provides a video decoding method comprising: decomposing a bitstream by extracting information on an encoded luminance component block, an encoded chrominance component block, and a color format from the bitstream; decoding the encoded luminance component block to reconstruct a current block of a luminance component; decoding the encoded chrominance component block in the color format according to the information on the color format to reconstruct the current block of a chrominance component; and outputting a reconstructed current block including a reconstructed current block of the luminance component and a reconstructed current block of the chrominance component.

Advantageous Effects

According to the disclosure as described above, an image constituting the video can be encoded and decoded in various color formats, improving the video compression performance.

DESCRIPTION OF DRAWINGS

FIG. 10 is an exemplary diagram of an algorithm for selecting color formats according to an aspect.

MODE FOR INVENTION

Figure 1:
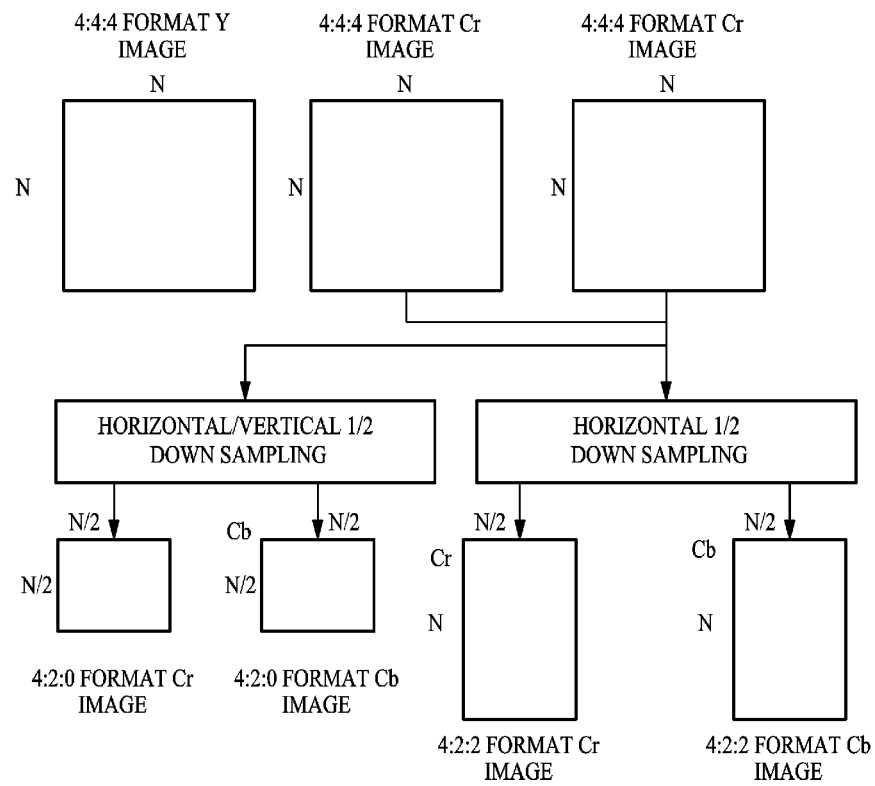
FIG. 1 is an exemplary diagram of color formats used in a video compression.

Hereinafter, some aspects of the present disclosure will be described in detail with reference to the accompanying drawings. In the following description, the same elements will be designated by the same reference numerals although they are shown in different drawings. Further, in the following description of the present disclosure, detailed descriptions of known functions and configurations incorporated herein will be omitted when they may make the subject matter of the present disclosure rather unclear.

Additionally, in describing the components of the present disclosure, there may be terms used like first, second, A, B, (a), and (b). These are solely for the purpose of differentiating one component from the other but not to define the substances, order or sequence of the components. If components were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is an exemplary diagram of color formats used in a video compression.

When compressing videos, in view of human eyesight being less acute to color information than to brightness information, R, G, B signals are converted to the equivalent expression of Y, Cr, Cb color signals which are then toned down with their spatial resolutions of colors through a lossy compression.

A 4:4:4 format of color image sized N×N pixels has a luminance component of an image brightness Y and two chrominance components of color images Cr and Cb which are commonly sized N×N. So, this is an image format including high quality picture color information with the presence of a corresponding pixel of a color image Cr, Cb to each pixel of the image brightness Y of the 4:4:4 format of color image.

A 4:2:2 format of color image is obtained by just horizontally down-sampling the pixels of the color images Cr and Cb in the 4:4:4 format with its vertically arranged pixels kept intact. If the 4:4:4 format of color image Cr, Cb is sized N×N pixels, the down-sampled color image Cr, Cb becomes an image sized N×(N/2) pixels.

A 4:2:0 format of color image is obtained by down-sampling the pixels of the color images Cr and Cb in the 4:4:4 format both vertically and horizontally. If the 4:4:4 format of color image Cr, Cb is sized N×N pixels, the down-sampled color image Cr, Cb becomes an image sized (N/2)×(N/2) pixels.

Figure 2:
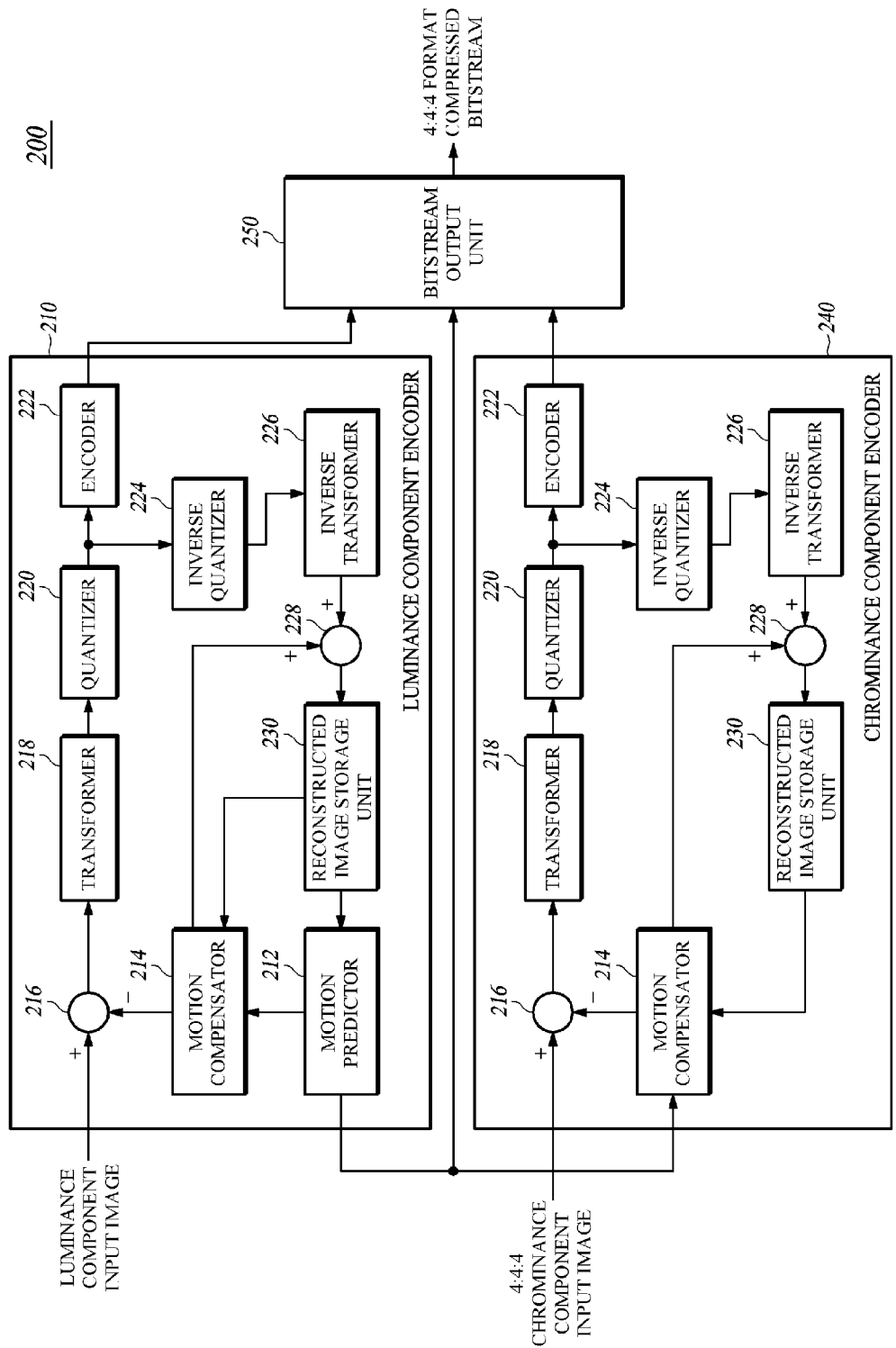
FIG. 2 is a schematic block diagram for showing a 4:4:4 format image encoding apparatus for encoding 4:4:4 format of color images.

FIG. 2 is a schematic block diagram for showing a 4:4:4 format image encoding apparatus 200 for encoding the 4:4:4 format of color images.

When a 4:4:4 format image formed of the Y, Cr, and Cb signals is inputted to 4:4:4 format image encoding apparatus 200 according to a related art, the luminance signal in the 4:4:4 format input image is encoded by a luminance component encoder 210, and the chrominance signals are encoded by a chrominance component encoder 240. The encoded luminance signal from luminance component encoder 210 and the encoded chrominance signals from chrominance component encoder 240 are processed and outputted by a bitstream output unit 250 as a bitstream for the 4:4:4 format image.

Luminance component encoder 210 may include a motion predictor 212 for predicting the motion vector of a current block from the inputted luminance Y signal, a motion compensator 214 for compensating the motion of the current block using the predicted motion vector to generate a predicted block of the current block, a subtractor 216 for subtracting the predicted block from the current block to generate a residual block, a transformer 218 for performing a frequency transform such as a discrete cosine transform (DCT) with respect to the residual block to generate residual block with a frequency coefficients, a quantizer 220 for quantizing the frequency coefficients of the frequency-transformed residual block, and an encoder 222 for encoding the quantized frequency coefficients by using an entropy encoding or other techniques to generate texture information for the luminance signal.

In addition, luminance component encoder 210 may include an inverse quantizer 224 for inversely quantizing the quantized frequency coefficients from quantizer 220, an inverse transformer 226 for inversely transforming the inversely quantized frequency coefficients to reconstruct the residual block, an adder 228 for adding the reconstructed residual block from inverse transformer 226 to the motion-compensated and predicted block from motion compensator 214 to generate a reconstructed current block for the luminance signal, and a reconstructed image storage unit 230 for storing the reconstructed current block for the luminance signal.

Chrominance component encoder 240 may comprise all of the components of luminance component encoder 210 as described except motion predictor 212. Here, the respective components of chrominance component encoder 240 perform functions that are equal or similar to those of luminance component encoder 210. However, luminance component encoder 210 performs the respective functions on the luminance signal whereas chrominance component encoder 240 performs its functions not on the luminance signal but with respect to the chrominance signals in the 4:4:4 format. In addition, motion compensator 214 of chrominance component encoder 240 generates the predicted block of the current block by compensating the motion of the current block using the motion vector predicted by motion predictor 212.

Bitstream output unit 250 generates and outputs a bitstream which includes texture information on the luminance signals outputted from luminance component encoder 210 and texture information on the chrominance signals outputted from chrominance component encoder 240. Such bitstream outputted is a compression of the 4:4:4 format image. In some cases, bitstream output unit 250 may further include the predicted motion vector from motion predictor 212 in the bitstream to be outputted.

Figure 3:
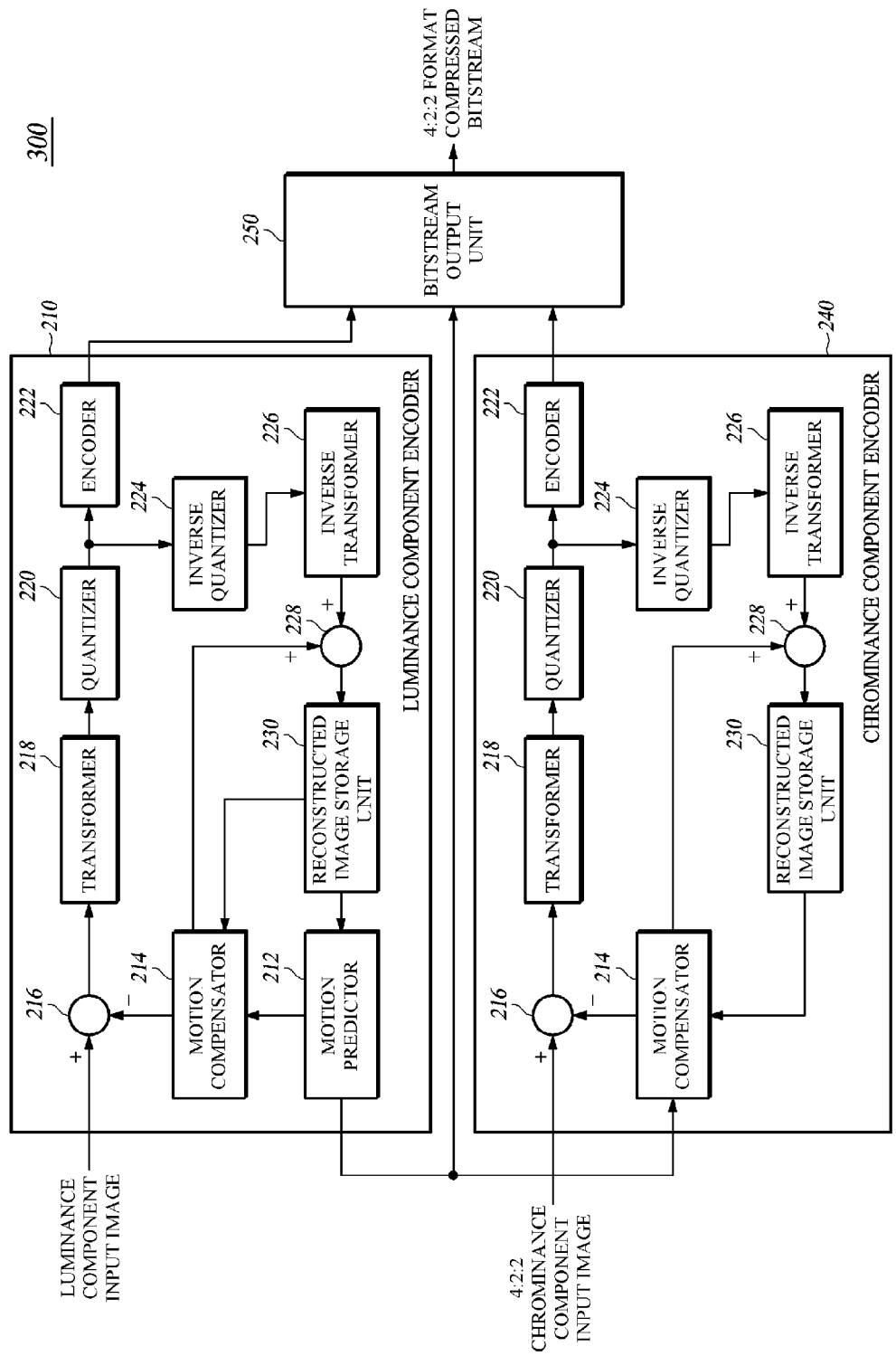
FIGS. 3 and 4 are schematic block diagrams for showing a 4:2:2 format image encoding apparatus for encoding 4:2:2 format of color images and a 4:2:0 format image encoding apparatus for encoding 4:2:0 format of color images.
Figure 4:
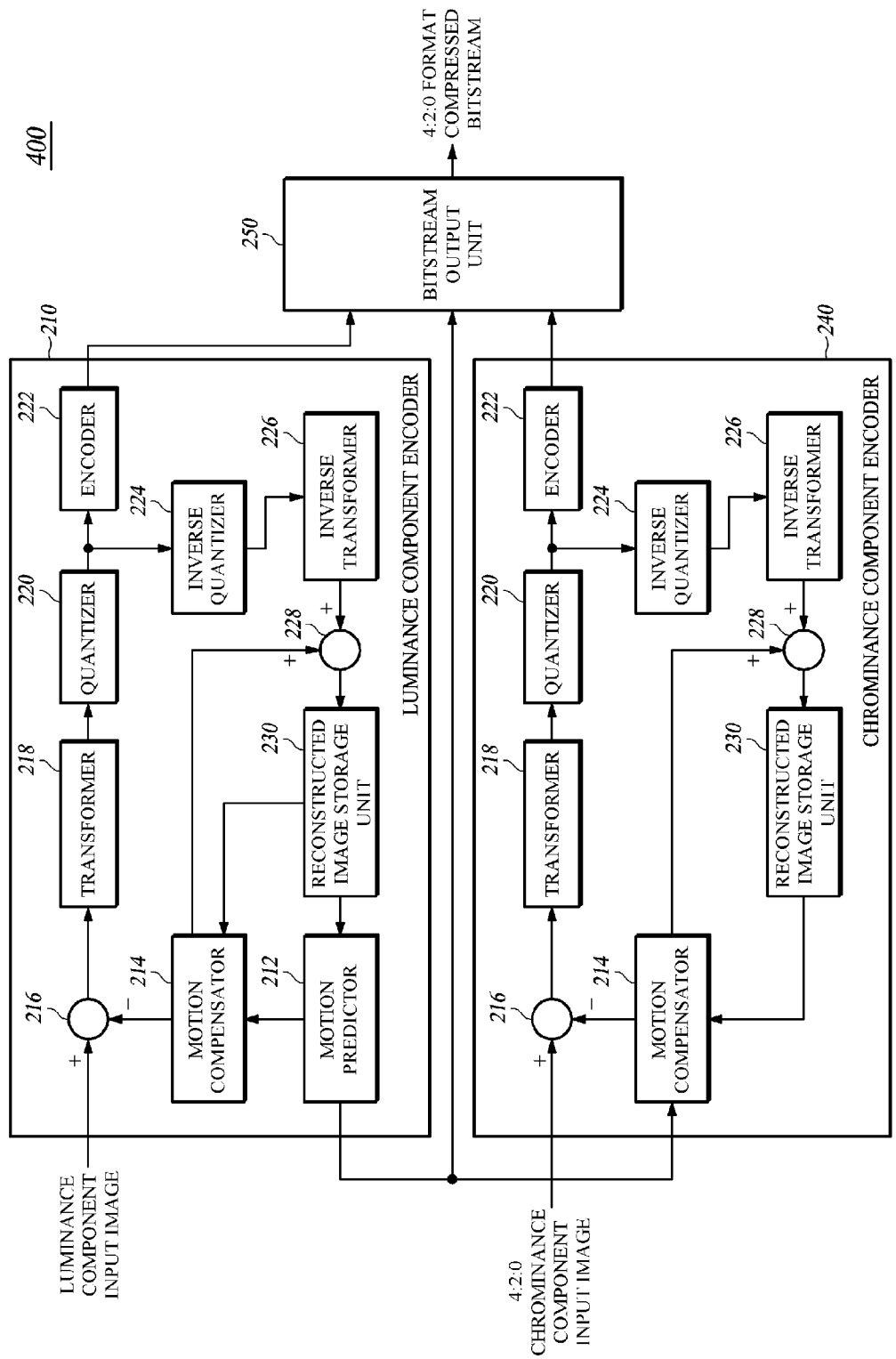

FIG. 3 is a schematic block diagram for showing a 4:2:2 format image encoding apparatus 300 for encoding 4:2:2 format color images, and FIG. 4 is a schematic block diagram for showing a 4:2:0 format image encoding apparatus 400 for encoding 4:2:0 format color images.

The constructions according to related arts of 4:2:2 format image encoding apparatus 300 and 4:2:0 format image encoding apparatus 400 are same as the construction of 4:4:4 format image encoding apparatus 200 described with reference to FIG. 2. However, in place of the input of the 4:4:4 format image, the 4:2:2 format image and 4:2:0 format image are respectively inputted; and chrominance component encoder 240 encodes 4:2:2 format chrominance signals and 4:2:0 format chrominance signals, respectively to generate texture information; and bitstreams from bitstream output unit 250 are compressions of the 4:2:2 format image and of 4:2:0 format image, respectively.

A problem remains unsolved that the separated encoding and compressing of an image in each of 4:4:4 format, 4:2:2 format, and 4:2:0 format has been limited to the image compression in its dedicated format, disabling a single image to be encoded in various color formats at once.

Figure 5:
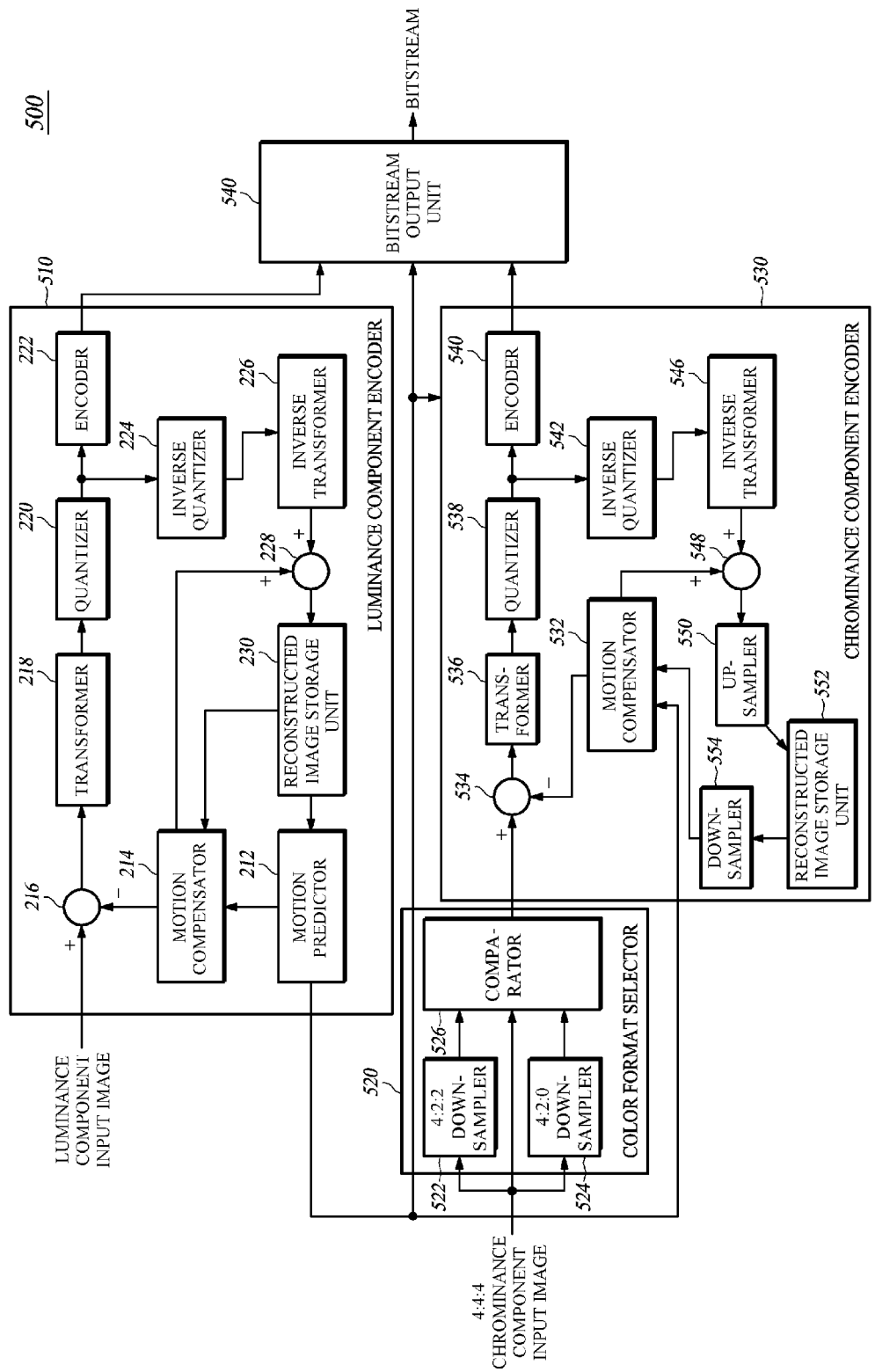
FIG. 5 is a schematic block diagram of a color image encoding apparatus according to an aspect.

FIG. 5 is a schematic block diagram of a color image encoding apparatus 500 according to an aspect of the present disclosure.

Color image encoding apparatus 500 in this aspect may comprise a luminance component encoder 510, a color format selector 520, a chrominance component encoder 530, and a bitstream output unit 540. Such color image encoding apparatus 500 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

Luminance component encoder 510 encodes a luminance component block of a current block of an image. Luminance component encoder 510 comprises all of the components of luminance component encoder 210 of 4:4:4 format image encoding apparatus 200 as described above, and functions similarly at the respective components. Here, the luminance component block means the current block of the luminance component that is generated by separating the luminance signal Y alone from the signals of luminance Y and chrominance Cr, Cb of the current block.

Color format selector 520 selects one of a number of color formats. Here, the number of color formats may be one of the 4:4:4 format, 4:2:2 format, and 4:2:0 format. In other words, color format selector 520 selects an optimal color format among the 4:4:4, 4:2:2, and 4:2:0 formats.

To this end, color format selector 520 may comprise a 4:2:2 down-sampler 522 responsive to an input of a 4:4:4 format of chrominance component image for horizontally down-sampling a 4:4:4 format of chrominance component block to generate a 4:2:2 format of chrominance component block; a 4:2:0 down-sampler 524 for vertically down-sampling and horizontally down-sampling the 4:4:4 format of chrominance component block to generate a 4:2:0 format of chrominance component block; and a comparator 526 for receiving the 4:4:4 format of chrominance component block, the 4:2:2 format of chrominance component block, and the 4:2:0 format of chrominance component block and selecting an optimal color format for the current block. Here, the chrominance component block means the current block of the luminance component that is generated by separating the chrominance signals Cr, Cb alone from the signals of luminance Y and chrominance Cr, Cb of the current block.

Comparator 526 may select the 4:2:2 format as the optimal color format of the current block if the sum of absolute difference (SAD) of the 4:4:4 format of chrominance component block B"444 up-sampled from the 4:2:2 format and the 4:4:4 format of chrominance component block B444 is smaller than a threshold. In addition, comparator 526 may select the 4:2:0 format as the optimal color format of the current block if the SAD of the 4:4:4 format of chrominance component block B'444 up-sampled from the 4:2:0 format and the 4:4:4 format of block B444 is smaller than the threshold. Here, the threshold may be an arbitrary constant which can be set variably depending on applications.

Additionally, comparator 526 may select the 4:4:4 format as the optimal color format of the current block if the SAD of B"444 and B444 is greater than or equal to the threshold. A diagram of an algorithm for color format selector 520 to select the color format in this way may be illustrated as FIG. 10.

Chrominance component encoder 530 encodes the chrominance component block of the image current block according to the selected color format. Chrominance component encoder 530 comprises all of the components of chrominance component encoder 240 of 4:4:4 format image encoding apparatus 200 as described with reference to FIG. 2, and functions similarly at the respective components.

Specifically, chrominance component encoder 530 may include a motion compensator 532 for compensating the motion of the chrominance component block outputted from color format selector 520 by using the predicted motion vector from motion predictor 212 of luminance component encoder 510 to predict the chrominance component block and generate a predicted chrominance component block, a subtractor 534 for subtracting the predicted chrominance component block from the chrominance component block to generate a residual chrominance component block, a transformer 536 for transforming the residual chrominance component block into a frequency domain, a quantizer 538 for quantizing the frequency domain transformation of the residual chrominance component block, and an encoder 540 for encoding and outputting the quantized residual chrominance component block. Further, chrominance component encoder 530 may include an inverse quantizer 542 for inversely quantizing the quantized residual chrominance component block, an inverse transformer 546 for inversely transforming the inversely quantized residual chrominance component block, and an adder 548 for adding the inversely transformed residual chrominance component block to the predicted chrominance component block from motion compensator 532 to reconstruct the chrominance component block.

Chrominance component encoder 530 may further include an up-sampler 550, a reconstructed image storage unit 552, and a down-sampler 554 wherein up-sampler 550 performs an up-sampling of the reconstructed chrominance component block from adder 548 into a 4:4:4 format chrominance component block. Such reconstructed and up-sampled chrominance component block is stored in reconstructed image storage unit 552. Of course, since the selected color format by color format selector 520 is the 4:4:4 format coinciding with the 4:4:4 format of the reconstructed chrominance component block through chrominance component encoder 530 that may encode, decode, and reconstruct the chrominance component block in the 4:4:4 format, up-sampler 550 may not repeat the up-sampling.

As motion compensator 532 compensates the motion of the chrominance component block using the predicted motion vector from motion predictor 212 of luminance component encoder 510, down-sampler 554 performs a down-sampling of the 4:4:4 format chrominance component block into the color format selected by color format selector 520 so as to use such block as a reference picture. Of course, if the stored chrominance component block in reconstructed image storage unit 552 is the 4:4:4 format coinciding with the 4:4:4 format of the selected color format by color format selector

520, down-sampler 554 may not repeat the down-sampling, and motion compensator 532 may use the reconstructed 4:4:4 format chrominance component block that passed an unnecessary down-sampling and is stored in reconstructed image storage unit 552 in its performance of the motion compensation.

As described, chrominance component encoder 530 in encoding the chrominance component block may predict and encode the same by performing the down-sampling in the selected color format with respect to the reconstructed 4:4:4 format chrominance component block in a previous storage. In addition, chrominance component encoder 530 may decode and reconstruct the predicted and encoded chrominance component block in the selected color format and up-samples the reconstructed result to a 4:4:4 format chrominance component block for storage. Further, chrominance component encoder 530 may use the motion vector that is used in luminance component encoder 510 for predicting the luminance component block so as to predict the chrominance component block.

A bitstream output unit 540 generates and outputs a bitstream which contains information on the encoded luminance component block, the encoded chrominance component block, and the encoded color format. In other words, bitstream output unit 540 may generate and output the bitstream by multiplexing the information on the encoded luminance component block from luminance component encoder 510, the encoded chrominance component block from chrominance component encoder 530, and the encoded color format from color format selector 520. For this purpose, bitstream output unit 540 may be implemented by a multiplexer. Additionally, bitstream output unit 540 may insert information on the color format into one or more of a block header, a slice header, and a picture header.

Here, the current block may be one or more of a 4×4 block, an 8×8 block, and a 16×16 block wherein the blocks are not meant to be rectangular blocks but may encompass various regions including rectangular, circular, or other shapes of regions.

Figure 6:
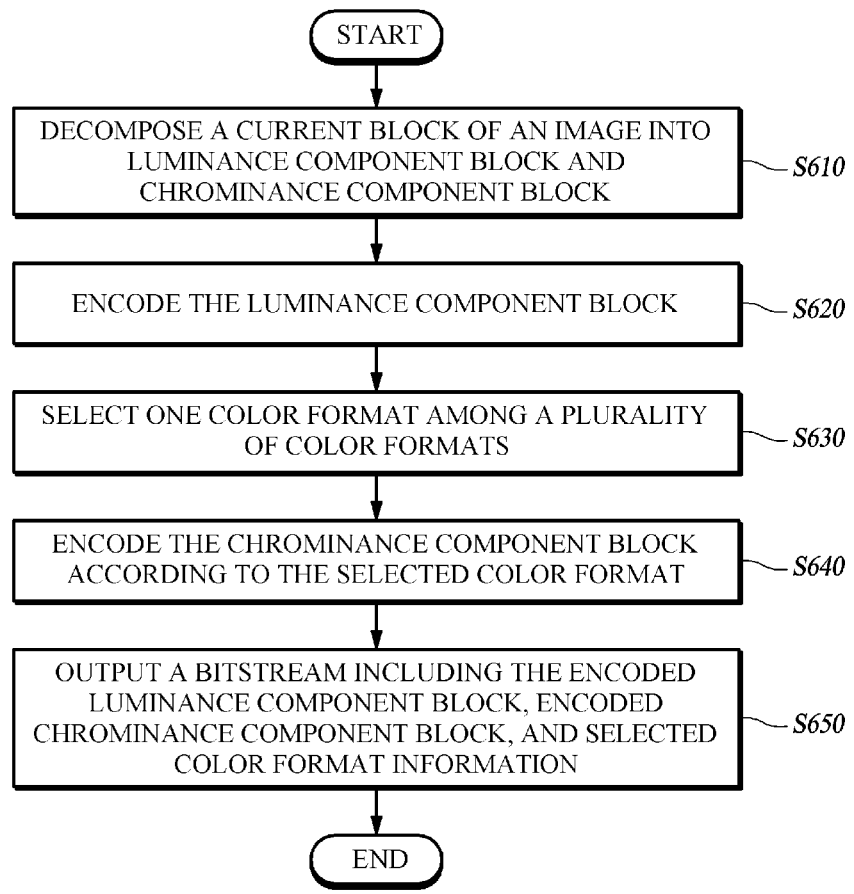
FIG. 6 is a flow diagram for illustrating a color image encoding method according to an aspect.

FIG. 6 is a flow diagram for illustrating a color image encoding method according to an aspect.

Color image encoding apparatus 500 decomposes a current block of an image into a luminance component block and a chrominance component block in step S610, and encodes the luminance component block in step S620. In addition, color image encoding apparatus 500 performs a selection of one color format among a plurality of color formats in step S630, encodes the chrominance component block according to the selected color format in step S640, and generates and outputs a bitstream including the encoded luminance component block, the encoded chrominance component block, and information on the selected color format in step S650. At this time, in step S630, the color format may be selected by using SAD and the selection may follow the description below referring and non-binding to FIG. 7.

Figure 7:
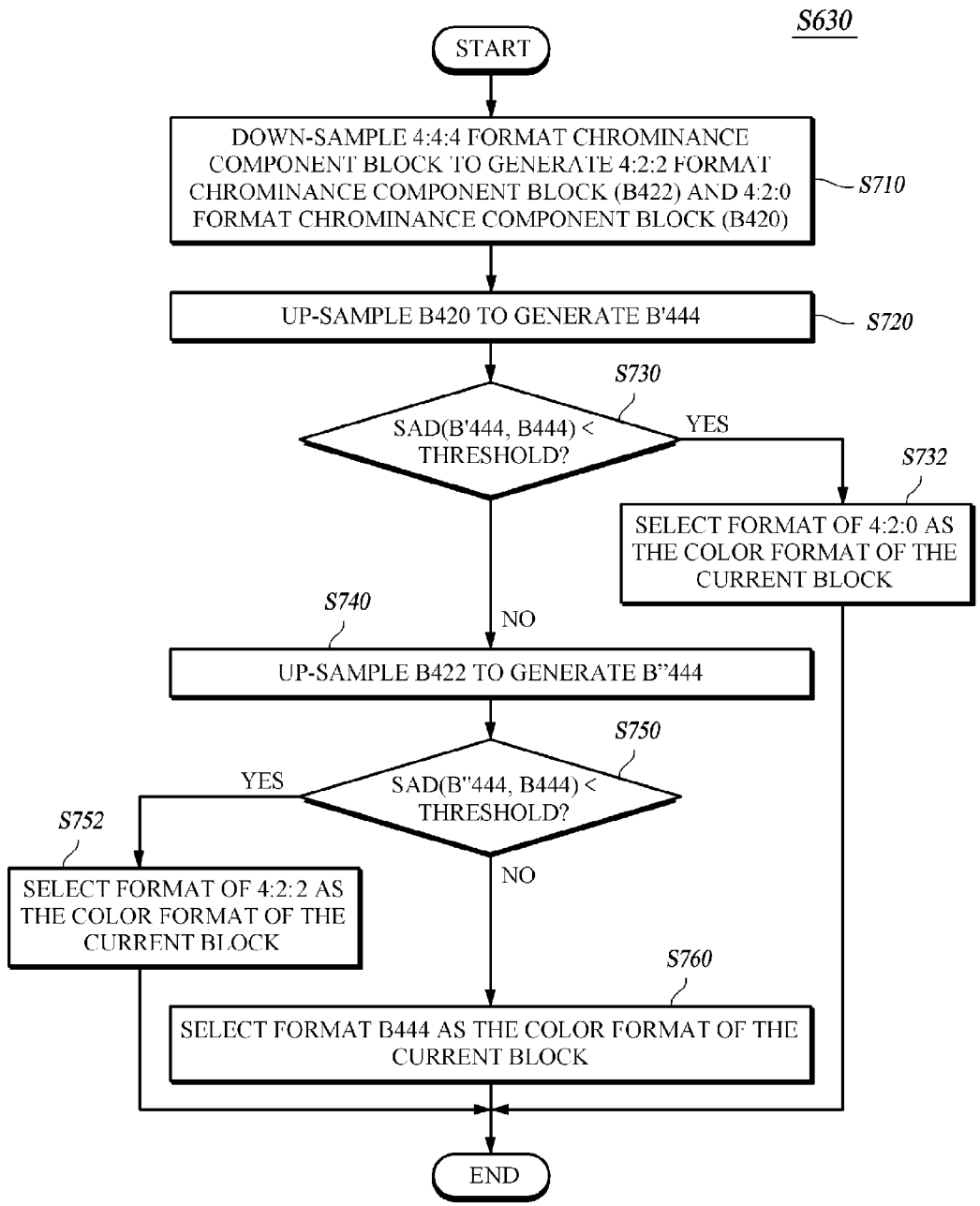
FIG. 7 is a flow diagram for illustrating a method for selecting color formats according to an aspect.

FIG. 7 is a flow diagram for illustrating a method for selecting color formats according to an aspect.

Color image encoding apparatus 500 down-samples the chrominance component block in a format of 4:4:4 to generate a 4:4:4 format chrominance component block B444, a 4:2:2 format chrominance component block B422, and a 4:2:0 format chrominance component block B420 in step S710. Specifically, color image encoding apparatus 500 horizontally down-samples the chrominance component block B444 decomposed in step S610 from the current block of the inputted image to generate the 4:2:2 format chrominance component block B422, and horizontally and vertically down-samples the chrominance component block B444 to generate the 4:2:0 format chrominance component block B420.

Color image encoding apparatus 500 up-samples the 4:2:0 format chrominance component block B420 to generate a 4:4:4 format chrominance component block B'444 sampled up to a format of 4:4:4 from the format of 4:2:0 in step S720. Specifically, the 4:2:0 format chrominance component block B420 is horizontally and vertically up-sampled to generate the 4:4:4 format chrominance component block B'444 sampled up from the format of 4:2:0.

Color image encoding apparatus 500 calculates the SAD of B'444 and B444 of the 4:4:4 format chrominance component block B'444 sampled up from the format of 4:2:0 and of the 4:4:4 format chrominance component block B444 and compares the calculated SAD of B'444 and B444 to a preset threshold to determine if the SAD of B'444 and B444 is smaller than the threshold in step S730, and if so, selects the format of 4:2:0 as the one color format that is optimal color format for the current block in step S732, and if the SAD of B'444 and B444 is greater than or equal to the threshold, up-samples the 4:2:2 format chrominance component block B422 to generate a 4:4:4 format chrominance component block B"444 sampled up from the format of 4:2:2 in step S740. That is, the 4:2:2 format chrominance component block B422 is horizontally up-sampled to generate the 4:4:4 format chrominance component block B"444 sampled up from the format of 4:2:2.

Color image encoding apparatus 500 calculates the SAD of B"444 and B444 of the 4:4:4 format chrominance component block B"444 sampled up from the format of 4:2:2 and of the 4:4:4 format chrominance component block B444 and compares the calculated SAD of B"444 and B444 to a preset threshold to determine if the SAD of B"444 and B444 is smaller than the threshold in step S750, and if so, selects the format of 4:2:2 as the one color format that is optimal color format for the current block in step S752, and if the SAD of B"444 and B444 is greater than or equal to the threshold, selects the 4:4:4 format as the one color format that is optimal color format for the current block in step S760.

The described steps in the flow diagrams of FIGS. 6 and 7 are merely examples for illustrative purpose and are not intended to occur necessarily in the described sequences. In other words, the sequences of the respective steps may be selectively changed in the sequence of execution and some or all of the steps may even be selectively performed in parallel. For example, although FIG. 7 illustrates steps S720, S730, and S732 are followed by steps S740, S750, and S752, steps S740, S750, and S752 may occur before steps S720, S730, and S732.

The video that was encoded as described into the bitstream by color image encoding apparatus 500 may then be transmitted in real time or non-real-time to a color video decoding apparatus described below for decoding the same before its reconstruction and reproduction into the video via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 8:
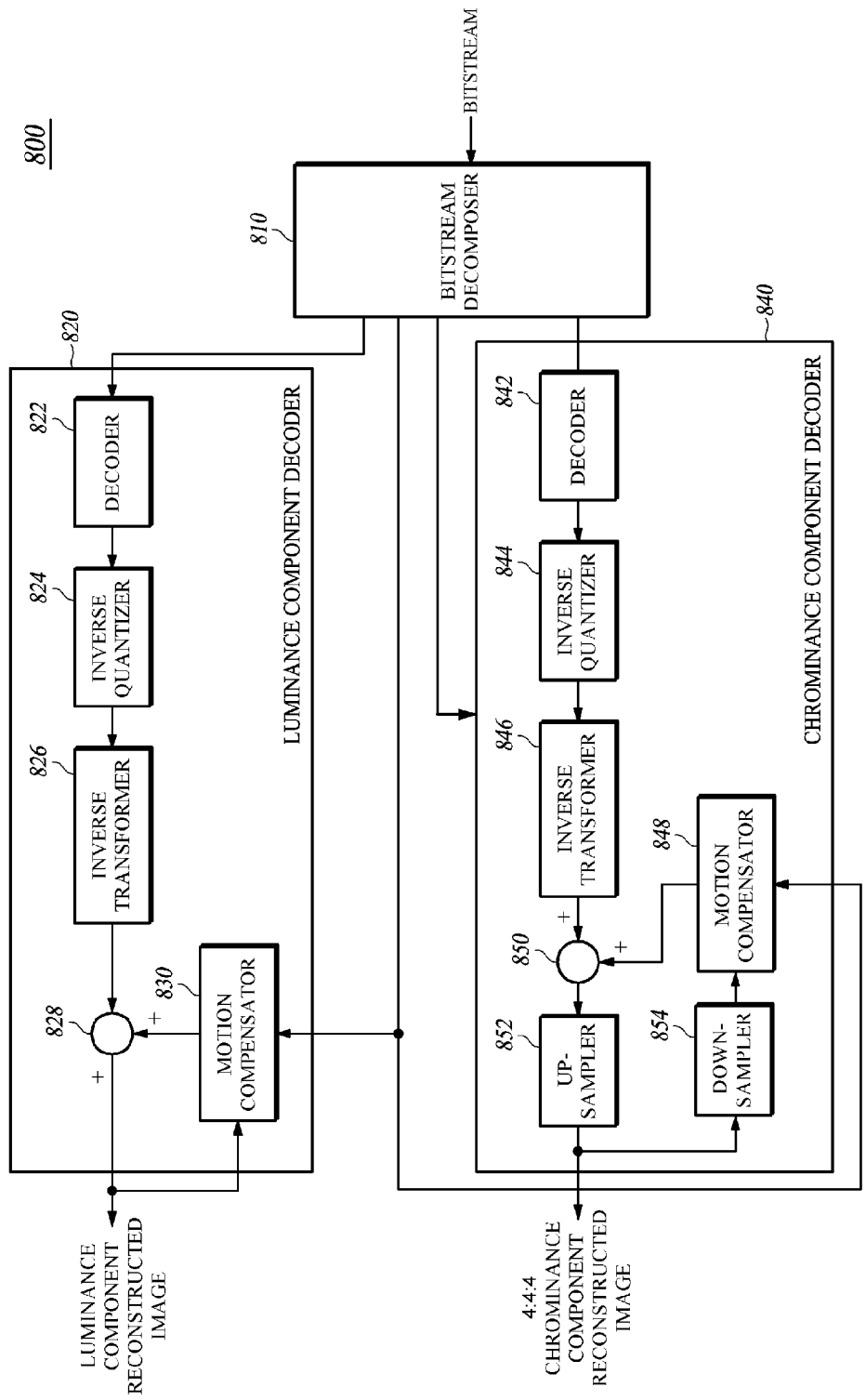
FIG. 8 is a schematic block diagram of a color image decoding apparatus according to an aspect.

FIG. 8 is a schematic block diagram of a color image decoding apparatus according to an aspect.

Color image decoding apparatus 800 in this aspect may comprise a bitstream decomposer 810, a luminance component decoder 820, and a chrominance component decoder 842. Such color image decoding apparatus 800 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

Bitstream decomposer 810 extracts information on an encoded luminance component block, an encoded chrominance component block, and a color format from a bitstream. That is, bitstream decomposer 810 is responsive to an input of the transmitted or previously stored bitstream for extracting the encoded luminance component block and the encoded chrominance component block from the bitstream and extracting the color format information inserted in the block header, slide header, picture header, etc. This bitstream decomposer 810 may be implemented by a demultiplexer.

Luminance component decoder 820 decodes the encoded luminance component block to reconstruct a current block of a luminance component. In other words, luminance component decoder 820 decodes the encoded luminance component block outputted from bitstream decomposer 810 to reconstruct the current block of the luminance component.

To this end, luminance component decoder 820 may include a decoder 822 for decoding the encoded luminance component block by using an entropy decoding technique or others to generate a residual block having quantized frequency coefficients of the luminance component, an inverse quantizer 824 for inversely quantizing the residual block having the quantized frequency coefficients of the luminance component to generate the residual block having the frequency coefficients of the luminance component, an inverse transformer 826 for inversely transforming the residual block having the frequency coefficients of the luminance component to reconstruct the residual block of the luminance component, a motion compensator 830 for compensating the motion of a current block of the luminance component to generate a predicted block of the luminance component, and an adder 828 for adding the predicted block of the luminance component to the reconstructed residual block of the luminance component to reconstruct the current block of the luminance component.

Here, bitstream decomposer 810 may additionally extract motion vector information from the bitstream wherein motion compensator 830 may use the additional extraction of the motion vector from the bitstream in compensating the motion of the current block of the luminance component to generate the predicted block of the luminance component.

Chrominance component decoder 840 decodes the chrominance component block encoded in the color format according to the color format information to reconstruct the current block of a chrominance component. Specifically, chrominance component decoder 840 reconstruct the current block of the chrominance component by decoding the encoded chrominance component block which is outputted from bitstream decomposer 810 in the color format identified by the color format information also outputted from bitstream decomposer 810.

To this end, chrominance component decoder 840 may include a decoder 842 for decoding the encoded chrominance component block by using an entropy decoding technique or others to generate a residual block having quantized frequency coefficients of the chrominance component, an inverse quantizer 844 for inversely quantizing the quantized frequency coefficients of the chrominance component to generate the residual block having the frequency coefficients of the chrominance component, an inverse transformer 846 for inversely transforming the residual block having the frequency coefficients of the chrominance component to reconstruct the residual block of the chrominance component, a motion compensator 848 for compensating the motion of a current block of the chrominance component to generate a predicted block of the chrominance component, and an adder 850 for adding the predicted block of the chrominance component to the reconstructed residual block of the chrominance component to reconstruct the current block of the chrominance component, an up-sampler 852 for up-sampling the current block of the chrominance component to generate a reconstructed 4:4:4 format current block of the chrominance component, and a down-sampler 854 for down-sampling reconstructed 4:4:4 format current block of the chrominance component in color format extracted by bitstream decomposer 810. Motion compensator 848 may use the reconstructed current block of the chrominance component after the down sampling by down-sampler 854 in compensating the motion of the current block of the chrominance component.

Here, up-sampler 852 may determine whether to perform the up-sampling and the manner of the up-sampling based on the color format identified by the color format information extracted by bitstream decomposer 810. For example, assuming the color format information extracted by bitstream decomposer 810 identifies a color format of 4:2:2, in response to the reconstructed current block of the chrominance component from adder 850 being in the same 4:2:2 format, up-sampler 852 may horizontally up-sample this reconstructed current block from adder 850 to generate and output the reconstructed 4:4:4 format current block of the chrominance component. In another example, assuming the color format information extracted by bitstream decomposer 810 identifies a color format of 4:4:4, coinciding with the 4:4:4 format of the reconstructed current block of the chrominance component from adder 850, up-sampler 852 may not repeat the up-sampling but simply output the reconstructed current block of the chrominance component from adder 850.

In addition, down-sampler 854 may determine whether to perform the down-sampling and the manner of the down-sampling based on the color format identified by the color format information extracted by bitstream decomposer 810. For example, assuming the color format information extracted by bitstream decomposer 810 identifies a color format of 4:2:2, in response to the reconstructed residual block of the chrominance component from inverse transformer 846 being in the same 4:2:2 format and in order to permit motion compensator 848 to compensate a 4:2:2 format current block of the chrominance component, down-sampler 854 may horizontally down-sample the reconstructed 4:4:4 format current block of the chrominance component from up-sampler 852 to generate and output a reconstructed 4:2:2 format current block of the chrominance component. In another example, assuming the color format information extracted by bitstream decomposer 810 identifies a color format of 4:4:4, coinciding with the 4:4:4 format of the reconstructed residual block of the chrominance component from inverse transformer 846, down-sampler 854 may not repeat the down-sampling but simply output the reconstructed 4:4:4 format current block of the chrominance component from up-sampler 852.

In other words, using means such as up-sampler 852 and down-sampler 854, chrominance component decoder 840 may carry out the up-sampling into 4:4:4 format for output with respect to the chrominance component blocks which went through decoding and reconstructing by color formats, and in decoding encoded chrominance component blocks, it may predict and decode the up-sampled and outputted chrominance component blocks in the 4:4:4 format through down-sampling the same in different color formats. Of course, the different color format herein may be one or more of 4:4:4 format, 4:2:2 format, and 4:2:0 format.

Figure 9:
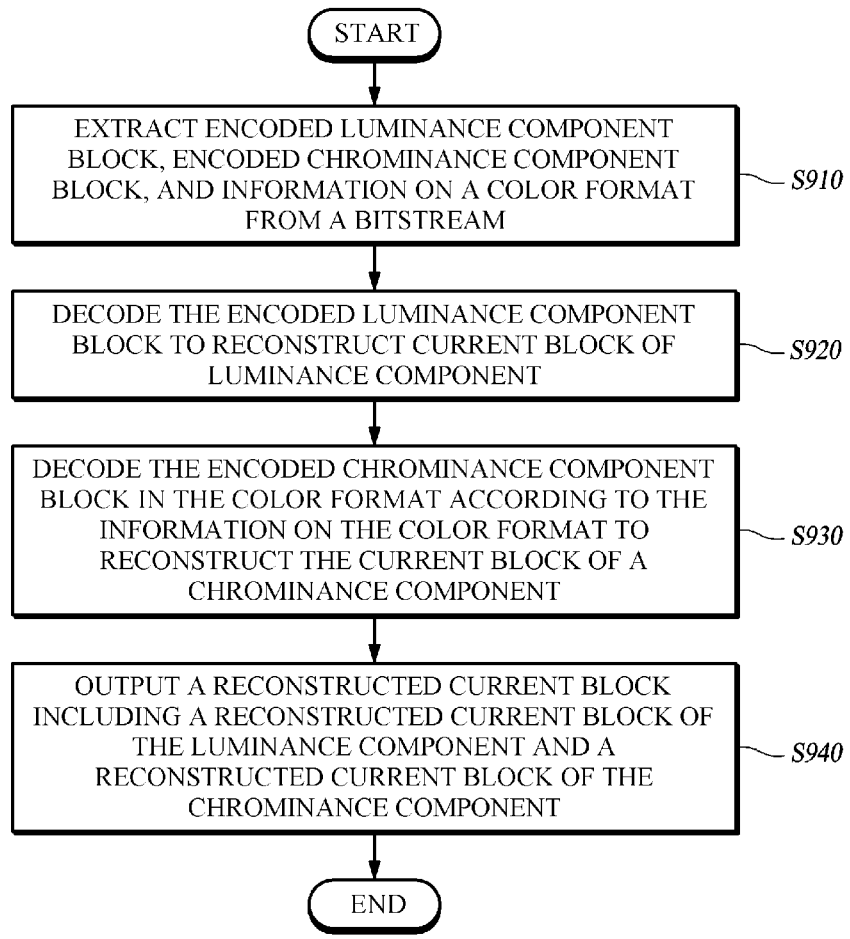
FIG. 9 is a flow diagram for illustrating a color image decoding method according to an aspect.

FIG. 9 is a flow diagram for illustrating a color image decoding method according to an aspect.

In order to reproduce video according to an algorithm selected by a user or included in another program under execution, color video decoding apparatus 800, having stored bitstreams of the video upon receiving through wired/wireless communication networks or cable, decodes and reconstructs the video. In the process, video decoding apparatus 800 extracts an encoded luminance component block, an encoded chrominance component block, and information on a color format from a bitstream in step S910, decodes the encoded luminance component block to reconstruct a current block of a luminance component in step S920, decodes the encoded chrominance component block in the color format according to the information on the color format to reconstruct the current block of a chrominance component in step S930; and outputting a reconstructed current block including a reconstructed block of the luminance component and a reconstructed block of the chrominance component in step S940.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application to video processing techniques of encoding/decoding or video compressing based on color information of the video to permit an image constituting the video is encoded and decoded in various color formats, improving the video compression performance.

The invention claimed is:

1. A video encoding apparatus for encoding an image using a plurality of color formats, the apparatus comprising:
   a luminance component encoder configured to encode a luminance component block of a current block of the image;
   a color format selector configured to select a color format among the plurality of color formats;
   a chrominance component encoder configured to encode a chrominance component block of the current block according to the selected color format; and
   a bitstream output unit configured to generate a bitstream including the encoded luminance component block, the encoded chrominance component block, and information on the selected color format,
   wherein the color format selector is configured to
      down-sample the chrominance component block,
      up-sample the down-sampled chrominance component block, and
      select the color format among the plurality of color formats based on a sum of absolute differences (SAD) of at least two chrominance component blocks,
   wherein the at least two chrominance component blocks include the chrominance component block and the up-sampled chrominance component block.

2. The video encoding apparatus of claim 1, wherein the plurality of color formats includes at least one selected from the group consisting of a 4:4:4 format, a 4:2:2 format and a 4:2:0 format.

3. The video encoding apparatus of claim 1,
   wherein the chrominance component block has a 4:4:4 format, the down-sampled chrominance component block has a 4:2:2 format, and the up-sampled chrominance component block has a 4:4:4 format,
   wherein the color format selector is configured to select a 4:2:2 format as the color format when an SAD of (i) the chrominance component block and (ii) the up-sampled chrominance component block is smaller than a threshold.

4. The video encoding apparatus of claim 1,
   wherein the chrominance component block has a 4:4:4 format, the down-sampled chrominance component block has a 4:2:0 format, and the up-sampled chrominance component block has a 4:4:4 format,
   wherein the color format selector is configured to select a 4:2:0 format as the color format when an SAD of (i) the chrominance component block and (ii) the up-sampled chrominance component block is smaller than a threshold.

5. The video encoding apparatus of claim 1,
   wherein the chrominance component block has a 4:4:4 format, the down-sampled chrominance component block has a 4:2:0 format or a 4:2:2 format, and the up-sampled chrominance component block has a 4:4:4 format,
   wherein the color format selector is configured to select a 4:4:4 format as the color format when
   an SAD of (i) the up-sampled chrominance component block up-sampled from a 4:2:2 format down-sampled chrominance component block and (ii) the chrominance component block is greater than or equal to a threshold and an SAD of (a) the up-sampled chrominance component block up-sampled from a 4:2:0 format down-sampled chrominance component block and (b) the chrominance component block is greater than or equal to the threshold.

6. The video encoding apparatus of claim 1, wherein the color format selector is configured to down-sample a 4:4:4 format chrominance component block to generate a 4:2:2 format chrominance component block or a 4:2:0 format chrominance component block.

7. The video encoding apparatus of claim 1, wherein the chrominance component encoder is configured to predict the chrominance component block using a 4:4:4 format chrominance component block which is down-sampled according to the selected color format.

8. The video encoding apparatus of claim 1, wherein the chrominance component encoder is configured to predict the chrominance component block by using a motion vector which is used for predicting the luminance component block in the luminance component encoder.

9. The video encoding apparatus of claim 1, wherein the bitstream output unit is configured to insert the information on the selected color format into at least one selected from the group consisting of a block header, a slice header, and a picture header of the bitstream.

10. The video encoding apparatus of claim 1, wherein the current block is at least one selected from the group consisting of a 4×4 block, an 8×8 block, a 16×16 block, a slice, and a picture.

11. A video encoding method for encoding an image using a plurality of color formats, the method comprising:
   decomposing a current block of the image into a luminance component block and a chrominance component block;
   encoding the luminance component block;
   selecting a color format among the plurality of color formats;
   encoding the chrominance component block according to the selected color format; and
   generating a bitstream including the encoded luminance component block, the encoded chrominance component block, and information on the selected color format
   wherein the selecting of the color format further comprises down-sampling the chrominance component block,
      up-sample the down-sampled chrominance component block, and
      selecting the color format from the plurality of color formats based on a sum of absolute differences (SAD) of at least two chrominance component blocks, wherein the at least two chrominance component blocks include the chrominance component block and the up-sampled chrominance component block.

12. The video encoding method of claim 11, wherein the selecting of the color format comprising:
   generating a 4:2:2 format chrominance component block and a 4:2:0 format chrominance component block by down-sampling a first 4:4:4 format chrominance component block;
   generating a second 4:4:4 format chrominance component block by up-sampling the 4:2:0 format chrominance component block;
   selecting the 4:2:0 format as the color format when an SAD of the first 4:4:4 format chrominance component block and the second 4:4:4 format chrominance component block is smaller than a threshold;
   generating a third 4:4:4 format chrominance component block by up-sampling the 4:2:2 format chrominance component block; and
   selecting the 4:2:2 format as the color format when an SAD of the first 4:4:4 format chrominance component block and the third 4:4:4 format chrominance component block is smaller than the threshold.

* * * * *